United States Patent Office 3,201,399
Patented Aug. 17, 1965

3,201,399
ONIUM TETRACYANOETHYLENIDES
Owen Wright Webster, Wilmington, Del., assignor to E. I. du Pont de Nemours and Company, Wilmington, Del., a corporation of Delaware
No Drawing. Filed Sept. 20, 1960, Ser. No. 57,152
12 Claims. (Cl. 260—268)

This invention is concerned with a new class of organic onium salts and a process for their preparation.

Tetracyanoethylene is highly reactive toward many organic compounds in forming derivatives with covalent bond structures. Tetracyanoethylene is also recognized as a Lewis acid or Pi acid capable of forming complexes with aromatic hydrocarbons in which the attachment between the two molecules involves a partial charge transfer as shown in "Organic Chemistry," by D. J. Cram and G. S. Hammond, McGraw-Hill, 1959, pages 181–182.

There have now been discovered the onium tetracyanoethylenides, including the ammonium, phosphonium, arsonium, stibonium, oxonium, sulfonium, selenonium, and telluronium tetracyanoethylenides, and a process for the preparation of onium tetracyanoethylenides by the reaction of a mixture of tetracyanoethylene and 1,1,2,2-tetracyanoethane with ammonia, an amine, a trisubstituted phosphine, a trisubstituted arsine, a trisubstituted stibine, a thioether, a selenoether, or a telluroether.

The compounds of this invention may be represented by the formula $A^\oplus(C_6N_4)^\ominus$, where $A^\oplus$ is an ammonium phosphonium, asonium, stibonium, oxonium, sulfonium, selenonium, or telluronium ion. A preferred group of these compounds may be represented by the above formula in which the ion $A^\oplus$ may be $NR^1R^2R^3R^4$, $PR^1R^5R^6R^7$, $AsR^1R^5R^6R^7$, $SbR^1R^5R^6R^7$
$OR^1R^5R^6$, $SR^1R^5R^6$, $SeR^1R^5R^6$, or $TeR^1R^5R^6$ where $R^1$, $R^2$, $R^3$, and $R^4$ may be hydrogen or an organic radical and $R^5$, $R^6$, and $R^7$ may be an organic radical, including structures in which two or more R's are joined to form a cyclic structure. Obviously, with the exception of nitrogen, not more than 1 hydrogen may be bonded to the central hetero atom in this invention.

In the onium tetracyanoethylenides of this invention, the tetracyanoethylenide portion is in the form of an ion radical ($C_6N_4^{-.}$) carrying a completely transferred electron. This ion radical has an ionic charge of −1 in the conventional sense. The formulas

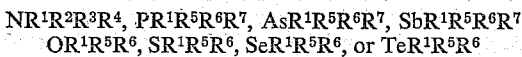

represent possible resonance structures for the tetracyanoethylenide ion radical.

The organic radicals included in the definition of the R's in the formula above may be varied widely and may include any non-acidic organic radical with its bond stemming from carbon. Particularly the radical may represent a carbon structure carrying as substituents halogen (i.e., F, Cl, Br), I, oxo, cyano, hydrocarbyloxy, hydrocarbyloxycarbonyl, acyl, and the like, usually not more than 1. The preferred organic radicals in the R's are hydrocarbyl groups and groups, otherwise hydrocarbyl, which contain heterocyclic nitrogen.

The onium tetracyanoethylenides are highly ionized salts and are readily distinguished from the charge-transfer complexes which are formed between tetracyanoethylene and the amines, for example. As illustrated in detail below, an onium tetracyanoethylenide reacts with hydrochloric acid to yield a mixture of tetracyanoethylene, 1,1,2,2-tetracyanoethane, and the corresponding onium chloride. On the other hand, when a charge-transfer complex of tetracyanoethylene, for example, a complex with an amine, reacts with hydrochloric acid, the only products are tetracyanoethylene and the corresponding onium chloride, no 1,1,2,2-tetracyanoethane being formed at all.

The onium tetracyanoethylenides have a distinct advantage over the corresponding metal tetracyanoethylenides in that the onium tetracyanoethylenides, when mixed with an oxident and used as rocket fuels, burn cleanly leaving no ash. They are converted entirely into thrust-producing gaseous products. On the contrary, combustion of a mixture of a metal tetracyanoethlenide and an oxidant always produces a substantial ash which is abrasive to the exhaust surfaces of the rocket and represents a loss in thrust due to the formation of solid rather than gaseous products.

Furthermore, the onium tetracyanoethylenides are soluble in many organic solvents. They therefore may serve as coloring agents in solution in the absence of oxygen and as oxygen scavengers in oxygen sensitive organic liquids. Also, by virtue of the reversibility of the reaction between the amine, tetracyanoethylene and 1,1,2,2-tetracyanoethane, the reaction may act as an indicator in acid-base titrations. For example, by titrating base with a mineral acid, such as hydrochloric acid, the color would discharge once the hydrochloric acid was in excess of the base. By virtue of the solubility of onium tetracyanoethylenides, they would be particularly valuable in non-aqueous systems as indicators.

In the process of this invention, the molar proportions of tetracyanoethylene and 1,1,2,2-tetracyanoethan employed are preferably in the range of 1:5 to 5:1. Proportions outside this range are operable, but the yield of onium tetracyanoethlenide is low under such circumstances. The ideal molar proportion of tetracyanoethylene to 1,1,2,2-tetracyanoethane is 1:1.

The amount of the amine, phosphine, arsine, stibine, thioether, selenoether, or telluroether employed in the process of this invention may be varied widely. Where the reactant of this class is a liquid, it is often convenient to employ a molecular excess of the latter compound, the excess serving as a reaction medium for the formation of the onium tetracyanoethylenide. However, no such added reaction medium is essential for the reaction to take place. It suffices to bring the appropriate reactants into intimate contact and allow them to stand without further attention, whereupon the corresponding onium tetracyanoethylenide is formed.

As a convenience in handling the reactants and products, it is sometimes desirable to carry out the reaction of this invention in the presence of a diluent which is inert to the reactants and products. When the diluent is a non-polar compound, for example, an ether such as tetrahydrofuran, in which the reactants are soluble and the onium tetracyanoethylenide is insoluble, the product precipitates from the solution as it is formed and is readily recovered by filtration.

As will be seen from the examples which follow, the temperature at which the process of this invention may be carried out can be varied widely. While temperatures in the range of −100° to +100° C. are preferred for convenience, any temperature up to the decomposition point of the reactants or products, whichever is lower, may be employed.

Pressure is not a critical factor in the process of this invention. Pressures above and below atmospheric pressure are fully operable. Atmospheric pressure is accordingly preferred for convenience.

The formation of an onium tetracyanoethylenide in the process of this invention takes precedence over other reactions known to occur between individual reactants in the mixture. For example, N,N-dimethylaniline is known to react with tetracyanoethylene alone to yield N,N-dimethyl-p-tricyanovinylaniline (U.S. 2,762,810). However, when a mixture of tetracyanoethylene and 1,1,2,2-tetracyanoethane reacts with dimethylaniline as shown below, N,N-dimethylanilinium tetracyanoethylenide is obtained.

The reaction of this invention may be illustrated by the following equation in which an amine is used as representative of the several types of cation-forming compounds shown above:

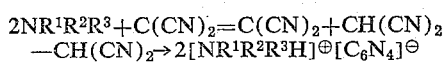

The R's are as defined above. It will be readily understood that other embodiments of A⊕ may be obtained by substituting other starting materials as listed above. From this equation it will be seen that the ideal molar ratio is two moles of ammonia, amine, phosphine, arsine, stibine, thioether, selenoether, or telluroether for each mole of tetracyanoethylene and mole of 1,1,2,2-tetracyanoethane. However, molar ratios of 20:1:1 to 0.2:1:1 are also operable, as well as similar ratios in which the proportions of tetracyanoethylene and 1,1,2,2-tetracyanoethane are varied as shown above.

The onium tetracyanoethylenides may also be prepared by metathesis from one another, as well as by metathesis from the metal tetracyanoethylenides. They may also be prepared by the reaction of tetracyanoethylene with the corresponding onium halide, particularly the iodides. These reactions are illustrated in the examples below.

The term "hydrocarbyl" used in the definitions above means generically any monovalent organic radical composed solely of carbon and hydrogen. The wide variation in the hydrocarbyl groups used in the illustrations which follow makes it evident that all hydrocarbyl groups are operable. Hydrocarbyl groups may vary as to whether they are alkyl, cycloalkyl, aryl, aralkyl, alkaryl, saturated, monounsaturated, diunsaturated, acetylenically unsaturated, single ring, multiring, straight chain, branched chain, large, small, and the like. The widest variation of this sort does not in any way detract from the fundamental characteristic of the hydrocarbyl radical of passing unchanged through the process of this invention and exercising no effect on the chemical steps of the process.

The limitations of space and disclosure are not to be construed as any limitation of the scope of "hydrocarbyl" contemplated in this invention. Even the most cumbersome hydrocarbyl radicals, such as those obtained by removing end groups from high molecular weight hydrocarbon polymer molecules containing thousands of carbon atoms, such as polyethylene, polyisobutylene, polystyrene, and the like, are fully operable.

Hydrocarbyl groups containing 20 or fewer carbon atoms are most available and to that extent preferred, but there is to be no question of the operability of, or of the intent to include and disclose, any hydrocarbyl group whatsoever. Variations in size and structure of the hydrocarbyl radicals have no effect on the essential chemical nature of the onium tetracyanoethylenides to which they are attached. All onium tetracyanoethylenides obtainable by variation of hydrocarbyl groups within the above definition are hereby disclosed.

The ammonium compounds are a preferred class. While, as has been previously stated all ammonium compounds are disclosed, particularly preferred are those ammonium compounds having attached to nitrogen, radicals such as hydrogen, lower alkyl, and aryl nuclei of up to 12 carbons, as well as nitrogen heterocyclics, i.e., having only nitrogen as the heteroatom, where the ammonium nitrogen is an annular member of five to ten membered monocyclic and bicyclic rings, having 4–10 carbons and 1–2 nitrogens. A preferred embodiment of the process is the formation of these compounds.

The onium tetracyanoethylenides can exist in the presence of oxygen, but they are gradually decomposed by it. To obtain the onium tetracyanoethylenides in good yields and to preserve them for practical use, it is highly desirable to reduce their contact with molecular oxygen to a minimum. It is to be understood that in the following examples all operations involving the preparation and examination of onium tetracyanoethylenides are preferably carried out in the essential absence of oxygen. This is accomplished most readily by blanketing the system with nitrogen. Reduction of access of oxygen may alternatively be obtained by employing other inert gases, i.e., helium, argon, and the like, as well as by operating under reduced pressure and other means known in the art.

In the following examples parts are by weight unless otherwise indicated.

EXAMPLE I

A solution of 100 parts of tetracyanoethylene and 100 parts of 1,1,2,2-tetracyanoethane in 2664 parts of tetrahydrofuran is cooled to 0° C., and a solution of 174 parts of dry 1,4-diazabicyclo[2.2.2]octane in 2664 parts of tetrahydrofuran is added gradually over a five-minute period. The purple solid which precipitates is collected by filtration, washed with tetrahydrofuran, and dried for four hours at 0.2 mm. to yield 260 parts of 4-aza-1-azoniabicyclo[2.2.2]octane tetracyanoethylenide. This product decomposes at 163° C., has an infrared absorption spectrum consistent with a trialkylammonium tetracyanoethylenide, and shows strong paramagnetic properties by electron paramagnetic resonance.

*Analysis.*—Calcd. for $C_{12}H_{13}N_6$: C, 59.70; H, 5.45; N, 34.80. Found: C, 59.77; H, 5.55; N, 34.42.

EXAMPLE II

A solution of 100 parts of tetracyanoethylene and 100 parts of 1,1,2,2-tetracyanoethane in 1776 parts of tetrahydrofuran is cooled to −80° C. and 157 parts of triethylamine is added. The mixture is stirred for ½ hour, and the purple precipitate which forms is collected by filtration under nitrogen at −80° C. There is obtained 200 parts of triethylammonium tetracyanoethylenide which is dried under reduced pressure while warming to room temperature. The infrared absorption spectrum is consistent with that of a trialkylammonium tetracyanoethylenide. The product decomposes slowly when exposed to air.

*Analysis.*—Calcd. for $C_{12}H_{16}N_5$: C, 62.60; H, 7.00. Found: C, 61.58, 62.31; H, 7.11, 6.98.

EXAMPLES III–IX

In Examples III–IX, portions of an acetonitrile solution containing a $10^{-4}$ molar concentration of tetracyanoethylene and a $10^{-4}$ molar concentration of 1,1,2,2-tetracyanoethane are treated, respectively, with a slight excess of the indicated amine. The yield of the corresponding onium tetracyanoethylenide is determined spectrographically by observing the absorption at 425 millimicrons which is characteristic of the tetracyanoethylenide ion.

| Example | Amine Used | Onium Tetracyanoethylenide Product | Yield (Percent) |
|---|---|---|---|
| III | Triethylamine | Triethylammonium tetracyanoethylenide. | 63 |
| IV | 1,4-diazabicyclo[2.2.2]-octane. | 4-aza-1-azoniabicyclo[2.2.2]-octane tetracyanoethylenide. | 35 |
| V | N,N-dimethylaniline | N,N-dimethylphenylammonium tetracyanoethylenide. | 63 |
| VI | Pyridine | Pyridinium tetracyanoethylenide. | 69 |
| VII | Butylamine | Butylammonium tetracyanoethylenide. | 13 |
| VIII | Aniline | Phenylammonium tetracyanoethylenide. | 14 |
| IX | N-methylaniline | Methylphenylammonium tetracyanoethylenide. | 15 |

EXAMPLE X

Solutions of 13 parts of tetracyanoethylene in 3340 parts of methylene chloride, 13 parts of 1,1,2,2-tetracyanoethane in 444 parts of tetrahydrofuran, and 26 parts of quinoline in 668 parts of methylene chloride are mixed together and quickly cooled to 0° C. After ten minutes, the golden brown needles which have formed are separated by filtration under nitrogen, washed with methylene chloride, and dried under nitrogen. There is obtained 21 parts of quinolinium tetracyanoethylenide having an electrical volume resistivity of $2.8 \times 10^9$ ohm-cm.; M.P. 93–95° C. (dec.).

*Analysis.*—Calcd. for $C_{15}H_8N_5$: C, 69.8; H, 3.1; N, 27.1. Found: C, 70.3; H, 3.4; N, 27.0.

EXAMPLE XI

The procedure of Example X is repeated with the exception that 31 parts of 2,2'-bipyridine is used in place of the quinoline. There is obtained 28 parts of 2-(2'-pyridyl)pyridinium tetracyanoethylenide in the form of golden brown platelets which have an electrical volume resistivity of $9.4 \times 10^7$ ohm-cm.; M.P. 95–97° C. (dec.).

*Analysis*—Calcd. for $C_6H_9N_6$: C, 67.4; H, 3.2; N, 29.5. Found: C, 68.1; H, 3.2; N, 28.8, 28.3.

EXAMPLE XII

The procedure of Example X is repeated with the exception that 21 parts of 2,6-lutidine is used in place of the quinoline. There is obtained 12 parts of 2,6-lutidinium tetracyanoethylenide in the form of golden brown needles having an electrical volume resistivity of $9.7 \times 10^7$ ohm-cm.; M.P. 105–107° C. (dec.).

*Analysis.*—Calcd. for $C_{13}H_{10}N_5$: C, 66.0; H, 4.2; N, 29.6. Found: C, 66.3; H, 4.3; N, 29.2.

EXAMPLE XIII

Part A

A mixture of 300 parts of dry potassium iodide and 170 parts of tetracyanoethylene is placed in a glass reactor. The system is evacuated and then filled with nitrogen. About 3920 parts of acetonitrile is added and the resulting suspension is agitated for four hours at room temperature. Filtration yields 114 parts of potassium tetracyanoethylenide in the form of bronze-colored crystals.

Part B

A suspension of 20 parts of potassium tetracyanoethylenide and 50 parts of tetramethylammonium chloride in 313 parts of acetonitrile is blanketed with nitrogen and stirred for four hours at room temperature. The reaction mixture is filtered, and the solvent is evaporated from the filtrate, leaving tetramethylammonium tetracyanoethylenide in the form of long plates. It is purified by recrystallization from acetonitrile. The tetracyanoethylenide is identified by its infrared absorption spectrum.

*Analysis.*—Calcd. for $C_{10}H_{12}N_5$: C, 59.40; H, 5.98; N, 34.64. Found: C, 58.63, 57.74; H, 6.25, 6.07; N, 33.85, 33.98.

EXAMPLE XIV

A solution of 10 parts of tetracyanoethylene in 783,000 parts of acetonitrile is treated with a molecular excess of tetraethylammonium iodide. Comparative spectrographic absorption analysis based on the band at 425 millimicrons shows a 73% yield of tetraethylammonium tetracyanoethylenide.

EXAMPLE XV

The process of Example XIV is repeated with the exception that methyltriphenylphosphonium iodide is used in place of tetraethylammonium iodide. A 73% yield of methyltriphenylphosphonium tetracyanoethylenide is obtained.

EXAMPLE XVI

The process of Example XIV is repeated with the exception that triphenylsulfonium iodide is used in place of tetraethylammonium iodide. Absorption spectral analysis shows a 31% yield of triphenylsulfonium tetracyanoethylenide.

EXAMPLE XVII

To a solution of 20 parts of tetracyanoethylene in 783,000 parts of acetonitrile is added a molecular excess of ammonium iodide. Comparative visible absorption spectral analysis shows a 70% yield of ammonium tetracyanoethylenide.

EXAMPLE XVIII

A $10^{-3}$ molar solution of tetracyanoethylene in acetonitrile is injected into a glass reactor containing a molecular excess of 2,4,6-triphenylpyrylium iodide. Examination of the electron paramagnetic resonance spectrum of the product shows the characteristic nine-line pattern associated with the tetracyanoethylenide ion radical, due to the presence of 2,4,6-triphenylpyrylium tetracyanoethylenide.

When the compounds indicated in Table I below are substituted for triethylamine in the reaction with tetracyanoethylene and 1,1,2,2-tetracyanoethane as in Example II, the indicated tetracyanoethylenides are obtained.

TABLE I

| Amine | Tetracyanoethylenide Product |
|---|---|
| 1-dimethylamino-3-chlorobutane | 3-chlorobutyldimethylammonium tetracyanoethylenide. |
| N,N-dimethyl-p-fluoroaniline | p-Fluorophenyldimethylammonium tetracyanoethylenide. |
| Beta-ethyleicosylaminoethyl bromide | Beta-bromoethylethyleicosylammonium tetracyanoethylenide. |
| N,N-dimethyl-p-iodoaniline | p-Iodophenyldimethylammonium tetracyanoethylenide. |
| 1-dimethylamino-3-butanone | 3-oxobutyldimethylammonium tetracyanoethylenide. |
| 4-dimethylaminobutyronitrile | 4-cyanobutyldimethylammonium tetracyanoethylenide. |
| Diethylaminomethyl methyl ether | Methoxymethyldiethylammonium tetracyanoethylenide. |
| 4'-methoxy-4-dimethylaminobiphenyl | 4-(4'-methoxybiphenyl)dimethylammonium tetracyanoethylenide. |
| Methyl beta-diethylaminopropionate | Beta-(methoxycarbonyl)ethydiethylammonium tetracyanoethylenide. |
| Alpha-dimethylaminoisobutyraldehyde | (2-oxo-1,1-dimethyl)ethyldimethylammonium tetracyanoethylenide. |
| Beta,beta',beta''-triethoxytriethylamine | Tris-beta-ethoxyethylammonium tetracyanoethylenide. |
| Beta,beta'-dichlorodiethylamine | Bis-beta-chloroethylammonium tetracyanoethylenide. |
| Octadecyl sulfide | Dioctadecylsulfonium tetracyanoethylenide. |
| Tridodecyl arsine | Tridodecylarsonium tetracyanoethylenide. |

When the onium iodides indicated in Table II below are substituted for tetraethylammonium iodide in the reaction with tetracyanoethylene as in Example XIV, the indicated tetracyanoethylenides are obtained.

TABLE II

| Onium Iodide | Tetracyanoethylenide Product |
|---|---|
| Methyltriphenylarsonium iodide | Methyltriphenylarsonium tetracyanoethylenide. |
| Triphenylselenonium iodide | Triphenylselenonium tetracyanoethylenide. |
| Triphenyltelluronium iodide | Triphenyltelluronium tetracyanoethylenide. |
| Tetraphenylstibonium iodide | Tetraphenylstibonium tetracyanoethylenide. |

As indicated above, the onium tetracyanoethylenides of this invention react with aqueous hydrochloric acid to yield a mixture of tetracyanoethylene, 1,1,2,2-tetracyanoethane, and the corresponding onium chloride. On the other hand, the charge-transfer complexes of tetracyanoethylene with amines, phosphines, arsines, and the like react with aqueous hydrochloric acid to yield only tetracyanoethylene and the corresponding onium chloride. This is illustrated in Examples A, B, and C which follow:

EXAMPLE A

Part A

The 1:1 charge-transfer compound (Pi complex) of 1,5-diaminonaphthalene with tetracyanoethylene, representative of the tetracyanoethylene charge-transfer compounds, is prepared as follows:

To a boiling solution of 12.8 parts of tetracyanoethylene in 11,200 parts of chloroform is added a room-temperature solution of 15.8 parts of 1,5-diaminonaphthalene in 1490 parts of chloroform. The resulting mixture is allowed to cool to room temperature, and the black shiny needles of the product are removed by filtration. The product is dried to yield 10 parts of the 1:1 1,5-diaminonaphthalene/tetracyanoethylene charge-transfer compound.

Part B

About five parts of the 1:1 1,5-diaminonaphthalene/tetracyanoethylene charge-transfer compound is shaken for a few minutes with 210 parts of 3N hydrochloric acid. The solid product which forms is collected by filtration and dried under reduced pressure to yield 3.9 parts of a mixture of tetracyanoethylene and 1,5-diaminonaphthalene hydrochloride. The infrared absorption spectrum of this product shows no bands at 1210, 1010, or 935 cm.$^{-1}$ confirming that no 1,1,2,2-tetracyanoethane is present. The product is heated under reduced pressure, and 0.2 part of tetracyanoethylene is recovered by sublimation and identified by its infrared absorption spectrum.

EXAMPLE B

The contrasting behavior of the onium tetracyanoethylenides on treatment with hydrochloric acid is illustrated in Examples B and C. In a process similar to that of Example II, the reaction of 7.5 parts of tetracyanoethylene, 7.5 parts of 1,1,2,2-tetracyanoethane, and 11.6 parts of triethylamine in 266 parts of tetrahydrofuran is carried out at −80° C. under nitrogen. The solid triethylammonium tetracyanoethylenide is collected by filtration, washed with ether, and dried under reduced pressure. This salt is then stirred with 210 parts of 3 N hydrochloric acid for about ten minutes. The solid residue (13 parts) is collected by filtration and dried under reduced pressure. The infrared absorption spectrum of this residue is identical with that of an authentic 1:1 mixture of tetracyanoethylene and 1,1,2,2-tetracyanoethane.

EXAMPLE C

Sixty-eight parts of 4-aza-1-azoniabicyclo[2.2.2]-octane tetracyanoethylenide, prepared as in Example I, is stirred with 1050 parts of 3 N hydrochloric acid for about ten minutes. An insoluble portion of the reaction product (two parts) is collected by filtration and dried. Its infrared absorption spectrum shows the presence of both tetracyanoethylene and 1,1,2,2-tetracyanoethane.

The onium tetracyanoethylenides of this invention are useful as reducing components in thrust-producing fuels. They may be combined with liquid or solid oxidizing agents either prior to use or at the time of ignition, and may be burned in devices known in the art for directing the thrust from such an oxidation reaction. The thrust-producing capacity of the onium tetracyanoethylenides may be illustrated as follows:

EXAMPLE D

A cellulosic tube closed at one end and having an inside diameter approximately 10 mm. and a length of approximately 100 mm. is packed with an intimate mixture of 64 parts of 4-aza-1-azoniabicyclo[2.2.2]octane tetracyanoethylenide and 110 parts of potassium perchlorate. The tube is placed on a horizontal support and fired by ignition of the mixture at the open end of the tube with an illuminating gas flame. The thrust from the oxidation reaction propels the rocket forward with great force.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. An onium tetracyanoethylenide of the formula: $A^{\oplus}(C_6N_4)^{\ominus}$ wherein $A^{\oplus}$ is selected from the group consisting of $PR^1R^5R^6R^7$, $AsR^1R^5R^6R^7$, $SbR^1R^5R^6R^7$, $OR^1R^5R^6$, $SR^1R^5R^6$, $SeR^1R^5R^6$, and $TeR^1R^5R^6$, wherein $R^1$ is selected from the group consisting of hydrogen, alkyl of 1 to 20 carbon atoms and phenyl, $R^5$, $R^6$ and $R^7$ each is selected from the group consisting of alkyl of 1 to 20 carbon atoms and phenyl, and wherein when two of said groups $R^5$, $R^6$ and $R^7$ are joined to form a cyclic structure, said joined groups form a phenylalkylene of up to 40 carbon atoms.

2. An onium tetracyanoethylenide of the formula $A^{\oplus}(C_6N_4)^{\ominus}$ wherein $A^{\oplus}$ is $NR^1R^2R^3R^4$, wherein $R^1$, $R^2$, $R^3$ and $R^4$ each is selected from the group consisting of hydrogen, alkyl of 1 to 20 carbon atoms, phenyl, phenyl and biphenyl both substituted with a member selected from the group consisting of halogen and alkyloxy, and alkyl of 1 to 20 carbon atoms substituted with a member selected from the group consisting of halogen, oxo, cyano, alkyloxy and alkyloxycarbonyl, said alkyl portion of said alkyloxy and alkyloxycarbonyl being lower alkyl.

3. The onium tetracyanoethylenide of claim 2 wherein said alkyl and substituted alkyl are lower alkyl and substituted lower alkyl, respectively.

4. An onium tetracyanoethylenide of the formula $$A^{\oplus}(C_6N_4)^{\ominus}$$

wherein $A^{\oplus}$ is an ammonium ion, the nitrogen atom of which is an annular member of a monocyclic nitrogen heterocycle having only nitrogen as the heteroatom and containing 4 to 10 carbon atoms and 1 to 2 nitrogen atoms.

5. An onium tetracyanoethylenide of the formula $$A^{\oplus}(C_6N_4)^{\ominus}$$

wherein $A^{\oplus}$ is an ammonium ion, the nitrogen atom of which is an annular member of a bicyclic nitrogen heterocycle having only nitrogen as the heteroatom and containing 4 to 10 carbon atoms and 1 to 2 nitrogen atoms.

6. 4-aza-1-azoniabicyclo[2.2.2]octane tetracyanoethylenide.

7. Triethylammonium tetracyanoethylenide.

8. N,N - dimethylphenylammonium tetracyanoethylenide.

9. Process for the preparation of an onium tetracyanoethylenide of the formula $$A^{\oplus}(C_6N_4)^{\ominus}$$

wherein $A^{\oplus}$ is an ion selected from the group consisting of ammonium, phosphonium, arsonium, stibonium, sulfonium, selenonium and telluronium which comprises reacting, in the essential absence of molecular oxygen and at a temperature in the range from −100° C. to the decomposition temperature of the reactants and products, (I) a compound selected from the group consisting of $NR^2R^3R^4$, $PR^5R^6R^7$, $AsR^5R^6R^7$, $SbR^5R^6R^7$, $SR^5R^6$, $SeR^5R^6$ and $TeR^5R^6$ wherein $R^5$, $R^6$ and $R^7$ each is selected from the group consisting of hydrocarbyl radicals of 1 to 20 carbon atoms and hydrocarbyl radicals of 1 to 20 carbon atoms substituted with a member selected from the group consisting of halogen, oxo, cyano, hydrocarbyloxy and hydrocarbyloxycarbonyl, and $R^2$, $R^3$ and $R^4$ each is selected from the group consisting of hydrogen and radicals defining $R^5$, $R^6$ and $R^7$ as above with (II) tetracyanoethylene and (III) 1,1,2,2-tetracyanoethane, the molar ratio of said tetracyanoethylene to said 1,1,2,2-tetracyanoethane being in the range 1:5 to 5:1 and the ratio of the combined moles of said tetracyanoethylene and 1,1,2,2-tetracyanoethane to the moles of said third reactant being in the range 2:20 to 2:0.2.

10. Process for the preparation of an ammonium tetracyanoethylenide which comprises reacting, in the essential absence of molecular oxygen and at a temperature in the range from −100° C. to the decomposition temperature of the reactants and products, (I) a compound of the formula $$NR^2R^3R^4$$

wherein $R^2$, $R^3$ and $R^4$ each is selected from the group consisting of hydrogen, hydrocarbyl radicals of 1 to 20 carbon atoms and hydrocarbyl radicals of 1 to 20 carbon atoms substituted with a member selected from the group consisting of halogen, oxo, cyano, hydrocarbyloxy and hydrocarbyloxycarbonyl with (II) tetracyanoethylene and (III) 1,1,2,2-tetracyanoethane, the molar ratio of said tetracyanoethylene to said 1,1,2,2-tetracyanoethane being in the range 1:5 to 5:1 and the ratio of the combined moles of said tetracyanoethylene and said 1,1,2,2-tetracyanoethane to the moles of said third reactant being in the range 2:20 to 2:0.2.

11. Process as defined in claim 10 wherein the mole ratio of tetracyanoethylene to 1,1,2,2-tetracyanoethane is 1:1.

12. Process for the preparation of tri(lower alkyl) ammonium tetracyanoethylenide which comprises reacting tri(lower alkyl)amine with a 1:1 mole ratio of tetracyanoethylene and 1,1,2,2-tetracyanoethane.

References Cited by the Examiner

UNITED STATES PATENTS

| | | | |
|---|---|---|---|
| 2,762,811 | 9/56 | Middleton | 260—465.5 |
| 2,766,243 | 10/56 | Middleton | 260—465.5 |
| 2,766,246 | 10/56 | Middleton | 260—465.8 |
| 2,809,972 | 10/57 | Middleton | 260—465.5 |

OTHER REFERENCES

Cairus et al., Jour. Amer. Chem. Soc., vol. 80, pages 2775–2795 (1958).

NICHOLAS S. RIZZO, *Primary Examiner.*

DUVAL McCUTCHEN, IRVING MARCUS, WALTER A. MODANCE, *Examiners.*